United States Patent
Daniels et al.

(10) Patent No.: US 6,185,992 B1
(45) Date of Patent: Feb. 13, 2001

(54) METHOD AND SYSTEM FOR INCREASING THE ACCURACY OF A PROBE-BASED INSTRUMENT MEASURING A HEATED SAMPLE

(75) Inventors: Robert Daniels, Goleta; Serguei Magonov, Santa Barbara, both of CA (US)

(73) Assignee: Veeco Instruments Inc., Plainview, NY (US)

( * ) Notice: Under 35 U.S.C. 154(b), the term of this patent shall be extended for 0 days.

(21) Appl. No.: 09/354,448

(22) Filed: Jul. 15, 1999

(51) Int. Cl.[7] .................................................. G01B 5/28
(52) U.S. Cl. ........................... 73/105; 250/306; 250/307
(58) Field of Search ................................. 73/105, 24.01; 374/138, 164, 167, 124; 250/306, 307

(56) References Cited

U.S. PATENT DOCUMENTS

| | | | |
|---|---|---|---|
| Re. 34,489 | 12/1993 | Hansma et al. | 250/560 |
| 3,878,728 | * 4/1975 | Marzetta | 73/432 SD |
| 4,132,881 | * 1/1979 | Ciarniello et al. | 219/203 |
| 4,841,148 | * 6/1989 | Lyding | 250/306 |
| 5,043,578 | * 8/1991 | Guethner et al. | 250/307 |
| 5,047,637 | * 9/1991 | Toda | 250/306 |
| 5,254,854 | 10/1993 | Betzig | 250/234 |
| 5,266,801 | 11/1993 | Elings et al. | 250/306 |
| 5,308,974 | 5/1994 | Elings et al. | 250/234 |
| 5,412,980 | 5/1995 | Elings et al. | 73/105 |
| 5,418,522 | * 5/1995 | Freundlieb et al. | 340/581 |
| 5,441,343 | 8/1995 | Pylkki et al. | 374/137 |
| 5,473,157 | * 12/1995 | Grober et al. | 250/234 |
| 5,519,212 | 5/1996 | Elings et al. | 250/234 |
| 5,652,428 | * 7/1997 | Nishioka et al. | 250/307 |
| 5,654,546 | 8/1997 | Lindsay | 250/306 |
| 5,731,587 | 3/1998 | DiBattista et al. | 250/443.1 |
| 5,821,545 | 10/1998 | Lindsay et al. | 250/443.1 |
| 5,929,438 | * 7/1999 | Suzuki et al. | 250/306 |
| 5,975,757 | * 11/1999 | Hopson et al. | 374/142 |

OTHER PUBLICATIONS

Benjamin W. Chui et al., *Cantilevers with Integrated Heaters and Integrated Piezoresistive Sensors for AFM Thermomechanical Data Storage*, Jun. 10, 1999, (4 pages).

Sergei Magonov and Yuli Godovksy, Digital Instruments brochure entitled *Atomic Force Microscopy of Polymers: Studies of Thermal Phase Transitions*, Jun. 1998, (8 pages).

Molecular Imagining OnLine article entitled *PicoSPM ™ Solutions Variable Temperature Stages*, Jun. 8, 1999, (2 pages).

JEOL, *Scanning Probe Microscope Specification JSPM–4200*, Jun. 8, 1999, (2 pages).

IBM, *The Visualization Lab*, Jun. 10, 1999, (4 pages).

F. Oulevey et al., *Review of Scientific Instruments*, Simple low–drift heating stage for scanning probe microscopes, Mar. 1999, pp. 1889–1890, vol. 70, No. 3.

(List continued on next page.)

Primary Examiner—Hezron Williams
Assistant Examiner—Michael Cygan
(74) Attorney, Agent, or Firm—Nilles & Nilles, S.C.

(57) ABSTRACT

A method of operating a probe-based instrument comprises placing a probe of the probe-based instrument in an operative state in which the probe interacts with a heated sample, measuring a parameter of probe operation indicative of a characteristic of the heated sample, and during the measuring step, maintaining interaction between the probe and the heated sample that is substantially free of influences caused by condensation on the probe. The maintaining step includes heating the probe to a temperature at which the measured parameter of probe operation is substantially free of influences caused by condensation on the probe. Heating the probe reduces or eliminates the formation of condensation on the probe from water or materials that have evaporated from the heated sample. The invention is especially useful in connection with atomic force microscopes and other probe-based instruments.

13 Claims, 10 Drawing Sheets

OTHER PUBLICATIONS

Y. Martin et al. Atomic Force Microscope–Force Mapping and Profiling on a Sub 100–Å Scale, J. Appl. Phys. 61 (10), May 15, 1987, pp. 4723–4729.

S.N. Magonov et al. AFM Study of Thermotropic Structural Transitions in Poly(diethylsiloxane), Polymer, vol. 38 No. 2, pp. 297–307, 1997.

S.N. Magonov et al., Tapping–Mode Atomic Force Microscopy Study of the Near–Surface Composition of a Styrene–Butadiene–Styrene Triblock Copolymer Film, Surface Science 389 (1997) pp. 201–211.

* cited by examiner

METHOD AND SYSTEM FOR INCREASING THE ACCURACY OF A PROBE-BASED INSTRUMENT MEASURING A HEATED SAMPLE

BACKGROUND OF THE INVENTION

1. Field of the Invention

This invention is in the field of microscopy and metrology, and specifically relates to heating a probe of a probe-based instrument to obtain stable measurements of a heated sample.

2. Description of the Related Art

A variety of probe-based microscopy and metrology instruments are known for obtaining metrology measurements and imaging of surface features to the Angstrom scale. These instruments include stylus profilometers and scanning probe microscopes (SPMs) including atomic force microscopes (AFMs). AFMs usually operate by creating relative motion between a probe and a sample surface using a high resolution three axis scanner while measuring the topography or some other surface property, as described in Hansma et al. in U.S. Pat. No. RE 34,489. AFMs typically include a probe, usually a very small cantilever fixed at one end with a sharp probe tip attached to the opposite, or free, end. The probe tip is brought very near to or into contact with a surface to be examined, and the deflection of the cantilever in response to the tip's interaction with the surface is measured with an extremely sensitive deflection detector, often an optical lever system such as described by Hansma et al, or some other deflection detector such as a strain gauge, capacitance sensor, or others well known in the art. Using piezoelectric scanners, optical lever deflection detectors, and very small probe cantilever arms fabricated using photolithographic techniques, AFMs can obtain resolution down to the atomic level on a wide variety of insulating or conductive surfaces in air, liquid or vacuum. Additionally, AFMs can obtain both surface information and subsurface information.

Because of their resolution and versatility, AFMs are important measurement devices in a diversity of fields ranging from semiconductor manufacturing to biological research. One major application of AFMs is high resolution mapping of polymer structures. Atomic force microscopy has made it possible to obtain information about the morphology and nanostructure of polymer materials, and has also made it possible to correlate the fine structural arrangement of the polymer with other properties, such as mechanical properties. Another major application of AFMs is compositional mapping of the distribution of polymer components. Atomic force microscopy has been utilized to obtain information about the extent to which different polymer components are perfectly blended when forming polymer blends.

Early AFMs operated in what is commonly referred to as contact mode by scanning the tip in contact with the surface, thereby causing the cantilever to bend in response to the sample features. Typically, the output of the deflection detector was used as an error signal to a feedback loop which servoed the vertical axis scanner up or down to maintain a constant preset cantilever deflection as the tip was scanned laterally over the sample surface topography. The servo signal versus lateral position created a topographic map (or image) of the sample surface. Thus, the AFM maintained a constant cantilever deflection and accordingly a constant force on the sample surface during lateral scanning. Using very small, microfabricated cantilevers, the tip-sample force in contact mode AFMs could be maintained at force levels sufficiently small to allow imaging of biological substances, and in some cases achieve atomic resolution. In addition, an AFM can measure very small force interactions between the tip and sample. By suitably preparing the probe, such as coating it with an appropriate material, other parameters such as magnetic or electric fields may be measured with an AFM.

Contact mode is basically a DC measurement. Other modes of operation have been developed in which the cantilever is oscillated. At this time, three oscillating probe modes are common in AFMs, non-contact (Martin, et al., J. Applied Physics 61(10) May 15, 1987), shear force (U.S. Pat. No. 5,254,854 by Betzig et al), and Tapping™ or TappingMode™ ("Tapping and TappingMode" are trademarks of Veeco Instruments, Inc.). U.S. patents relating to Tapping and TappingMode include U.S. Pat. Nos. 5,226, 801, 5,412,980 and 5,519,212, by Elings et al. These modes, particularly TappingMode, have become extremely commercially successful. An improved mode of operation which has also become extremely commercially successful is light Tapping, which is disclosed in U.S. patent application Ser. No. 08/984,058 (allowed May 10, 1999).

In oscillating AFM operation, the probe is oscillated, typically at or near the probe's resonant frequency, and brought near the sample surface. In all oscillation modes the effect of the surface on probe oscillation is used as one of the signals of interest, either as an error signal for a feedback loop or as direct measure of tip-sample interaction. For example, many AFMs in an oscillating mode employ a feedback loop that uses changes in the oscillation amplitude due to interaction with the surface to maintain that amplitude substantially constant. In non-contact and TappingMode operations, the free oscillation is substantially perpendicular (AFM cantilevers are commonly at an 11–12 degree angle of declination) to the plane of the sample surface, while in shear force measurement operation, the free oscillation is essentially parallel with the plane of the sample surface. Non-contact operation relies on non-contact force gradients to affect the resonant properties of the probe in a measurable fashion, while TappingMode operation relies on the more robust interaction of actually striking the surface and losing some energy to the surface (see, e.g., U.S. patent application Ser. No. 08/898,469 by Cleveland, issued as U.S. Pat. No. 6,038,916). Mixed modes such as Tapping for topography measurements and non-contact for other force measurements, i.e., magnetic field, are commonly used (see, e.g., U.S. Pat. No. 5,308,974 by Elings et al.).

In addition to the modes described above, other modes of operation of an atomic force microscope are also possible. The invention can be used in all of these modes of operation. Additionally, although the invention will be described in the context of AFMs, it should be understood that the invention is applicable to other SPMs and to probe-based instruments in general. Therefore, for example, the invention may also be utilized in conjunction with stylus profilometers.

AFM measurements are commonly performed at ambient conditions. However, with the development of AFM applications, there has arisen a need to be able to perform AFM measurements at elevated temperatures. This is especially important for studies of polymer materials, whose structure and performance strongly depends on temperature because of the thermal phase transitions inherent to such materials.

In order to perform AFM measurements at elevated temperatures, it is known to use a sample stage heater to heat a sample while performing AFM measurements. Problems have been encountered when attempting to obtain measurements of heated samples, however, because condensation occurs on the cantilever of the AFM probe. Droplets ranging from a few microns to tens of microns in size and can be distinguished in an optical microscope. The droplets typically appear and change size at a broad range of temperatures depending on the volatility of compounds in the sample and the surrounding vapor pressure for those compounds, and are also attributable in part to condensed water or other volatiles from the atmosphere. Droplets of volatile compounds emitted from the heated sample also condense on the relatively cool probe. The reason for the condensation is that the temperature of the cantilever, which is ordinarily 10 to 15 microns away from the hot sample, is cooler than the sample. Consequently, traces of moisture that have been heated in the immediate vicinity of the hot sample condense on the cooler cantilever surface.

This condensation prevents sufficiently stable imaging for at least two reasons. First, the droplets significantly hamper measurements of probe deflection (in a contact mode of operation) or measurements of probe oscillation amplitude, phase or frequency (in an oscillation mode of operation). For example, in systems that use an optical detection scheme, the spherical shape of the condensed droplets leads to scattering of the laser beam which in turn leads to a reduction in the intensity or diffusion of the reflected laser beam that is detected by the detectors. Therefore, the signal to noise ratio of the measurement substantially decreases. Additionally, the intensity of the reflected laser beam also fluctuates because of the spontaneous appearance and disappearance of the water droplets. The formation of droplets may also change the electrical characteristics of cantilevers that are actuated or have their deflections measured by piezoelectric or other elements on the cantilever itself.

The second problem is that the droplets affect the effective physical properties of the cantilever. For instance, because the accretion of droplets effectively increases the mass of the cantilever, the resonant frequency of the cantilever decreases, and also becomes unstable due to the continuous changes in the mass of the cantilever associated with the spontaneous appearance and disappearance of the droplets. In practice, variations of about 400 Hz in the resonant frequency of the cantilever have been observed.

To remedy the condensation problem, attempts have been made to enclose the sample in a humidity-free atmosphere, such as a dry nitrogen atmosphere or vacuum. However, this approach does not completely eliminate the problem of condensation on the probe because, even when all of the water is eliminated from the atmosphere, droplets of volatile compounds from the heated sample still condense on the probe.

Other attempts have been made to continuously purge the sample atmosphere to keep the atmosphere dry. According to this approach, moisture associated with the evaporated volatile sample components is continuously removed from the sample chamber and replaced with dry nitrogen, for example. However, purging the atmosphere in this manner causes cantilever movement due to gas currents moving around it (like a flag waving in the wind) and therefore introduces additional noise during imaging. Due to problems of these types, stable AFM measurements at elevated temperatures have remained elusive.

OBJECTS AND SUMMARY OF THE INVENTION

It is therefore a primary object of the invention to provide a method of operating a probe-based instrument that produces stable measurements at elevated sample temperatures.

In accordance with a first aspect of the invention, the invention provides a method of operating a probe-based instrument, such as an atomic force microscope, comprising placing a probe of the probe-based instrument in an operative state in which the probe interacts with a heated sample, measuring a parameter of probe operation indicative of a characteristic of the heated sample, and during the measuring step, maintaining interaction between the probe and the heated sample that is substantially free of influences caused by condensation on the probe. The maintaining step includes heating the probe to a temperature at which the measured parameter of probe operation is substantially free of influences caused by condensation on the probe.

The parameter of probe operation can be a parameter of probe oscillation, such as probe oscillation phase (i.e., a phase of the probe relative to a phase of an oscillator which drives the probe to oscillate) (see, e.g., U.S. patent application Ser. No. 08/898,469 by Cleveland, issued as U.S. Pat. No. 6,038,916), amplitude, or frequency, for example, in an oscillation mode of operation. The parameter of probe operation can also be a deflection of the probe, for example, in a contact mode of operation. Preferably, the probe is heated to a temperature that at least substantially prevents condensation from forming on the probe and removes any existing condensation.

It is another primary object of the invention to provide a method of operating an atomic force microscope so as to heat a probe of the microscope to a temperature at which a measured operating parameter of probe operation is substantially free of influences caused by condensation on the probe.

In accordance with a second aspect of the invention, the invention provides a method of operating an atomic force microscope having a probe, comprising heating a sample, measuring a parameter of probe operation and determining whether the measured parameter of probe operation is substantially stable, and raising a temperature of the probe if the measured parameter of probe operation is not substantially stable. The method then also comprises repeating the measuring and raising steps until the probe reaches a temperature at which it is determined that the measured operating parameter of probe operation is substantially free of influences caused by condensation on the probe. Again, the parameter of probe operation can be a parameter of probe oscillation, such as probe oscillation phase, amplitude, or frequency, for example, in an oscillation mode of operation, or the parameter of probe operation can be a deflection of the probe, for example, in a contact mode of operation.

It is yet another primary object of the invention to provide an atomic force microscope that is able to measure a parameter of probe operation in a manner that is substantially free of influences caused by condensation on a probe of the microscope.

In accordance with a third aspect of the invention, the invention provides an atomic force microscope comprising a probe, a probe heater, a sensor and a controller. The probe heater is thermally coupled to the probe and heats the probe to a temperature above ambient temperature. The controller is coupled to the probe heater and controls operation of the probe heater to heat the probe to a temperature at which a parameter of probe operation measured by the sensor is substantially free of influences caused by condensation on the probe. This temperature may be discovered during or prior to measurement.

Advantageously, therefore, when performing measurements at elevated sample temperatures, sources of measurement instability associated with the formation of condensation on the probe can be dramatically reduced or eliminated by heating the probe. Because condensation is reduced, probe deflection/oscillation parameters can be more accurately measured and there is reduced instability in the resonant frequency and amplitude of the probe oscillation. This allows more stable measurements to be obtained and therefore improves the performance of probe-based instrument at elevated sample temperatures.

Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals indicate like parts throughout, and in which.

DETAILED DESCRIPTION OF THE PREFERRED EMBODIMENTS

1. Structure of Preferred Embodiments

Figure 1:
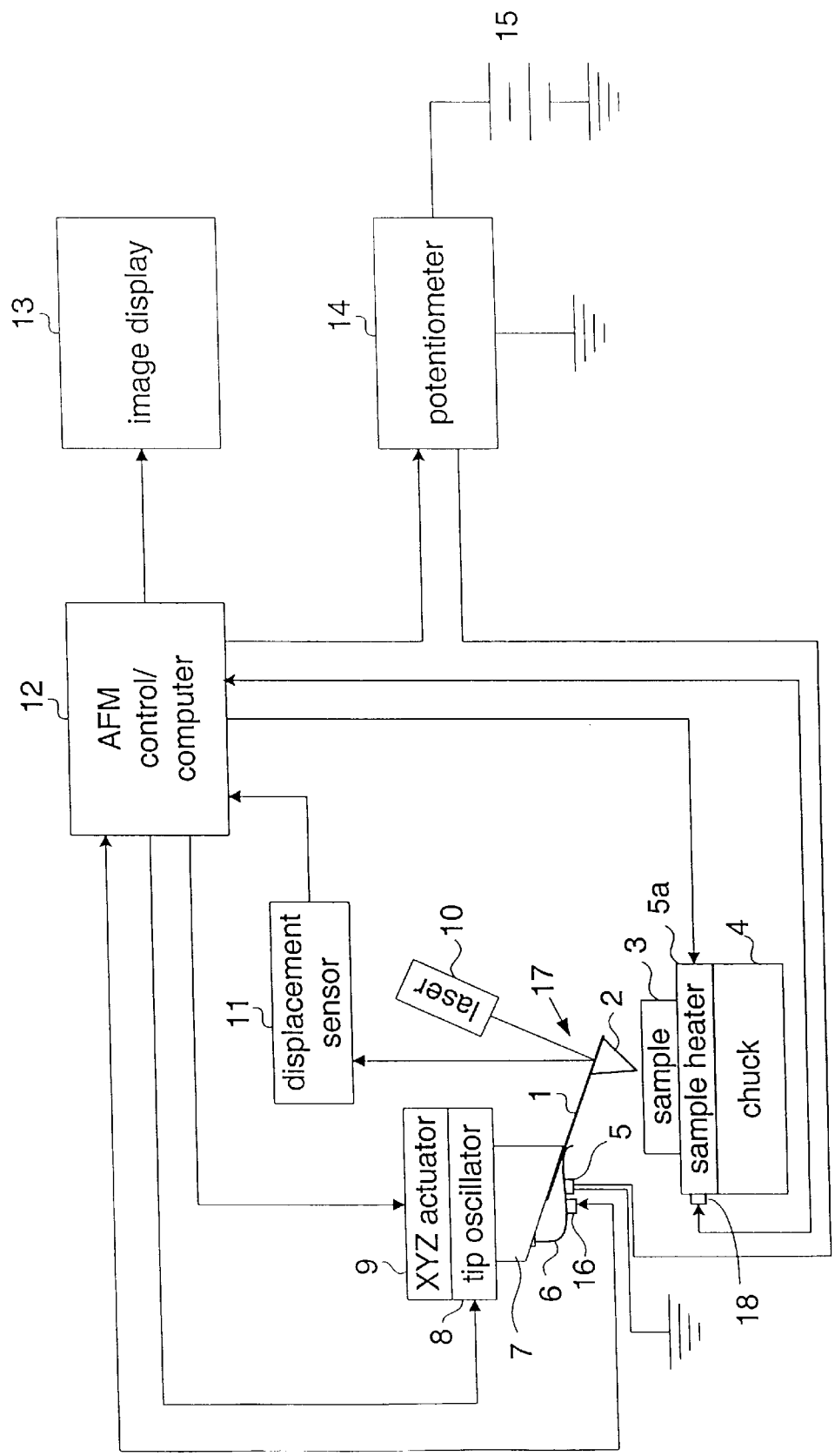
FIG. 1 is a schematic representation of a first embodiment of an AFM that is usable to take measurements of a heated sample.

Referring now to FIG. 1, a schematic representation of a first embodiment of an AFM that is usable to take measurements of a heated sample is illustrated. In particular, the AFM utilizes a probe 17 including a cantilever 1 and a tip 2 to obtain measurements from a sample 3, which is positioned on a heater 5a and chuck 4. The sample 3 and the cantilever 1 are each provided with respective heaters 5a and 5b. The heater 5a is in thermal communication with the sample 3 and is usable to heat the sample 3. Likewise, the heater 5b is in thermal communication with the cantilever 1 and is usable to heat the cantilever 1.

The heater 5b is mounted on a spring clip 6 which is preferably formed of copper or other thermoconductive material so as to promote heat transfer from the heater 5b to the cantilever 1. The spring clip 6, along with a spring clip base 7, mounts the probe 17 to a tip oscillator 8 and an XYZ actuator 9.

The tip oscillator 8 is utilized in modes that involve oscillating the probe 17 (e.g., Tapping, TappingMode and light Tapping), as discussed above. In contact mode, the tip oscillator 8 is disengaged or eliminated altogether. The XYZ actuator 9 and, depending on the mode of operation, the tip oscillator 8, cooperate during normal operation of the AFM to control interaction (e.g., deflection or oscillation) of the probe 17 relative to the sample 3 so as to maintain the interaction substantially constant. The XYZ actuator 9 also controls XY scanning of the probe 17 relative to the sample 3, so that information may be obtained regarding most or all of the surface (or subsurface) of interest of the sample 3.

In the illustrated embodiment, deflection/oscillation of the cantilever 1 is detected using an optical detection arrangement that includes a laser 10 and a displacement sensor 11, which may for example comprise a four quadrant photodetector (see, e.g., U.S. Pat. No. 5,463,897 by Prater et al.). In particular, the laser 10 and the displacement sensor 11 are used to implement feedback control of the cantilever 1 and tip 2. For example, in contact mode, the laser 10 and displacement sensor 11 are used to measure a parameter of probe deflection, for example, an angle of deflection of the cantilever 1. The deflection can be either lateral deflection, vertical deflection or a combination of both. In an oscillation mode, the laser 10 and displacement sensor 11 are used to measure a parameter of probe oscillation, such as phase (i.e., the phase of the probe oscillation relative to the phase of the oscillator 8 that drives the probe 17 to oscillate) (see, e.g., U.S. patent application Ser. No. 08/898,469, issued as U.S. Pat. No. 6,038,916), amplitude or frequency. An AFM control computer 12 monitors the feedback generated by the displacement sensor 10 to control the XYZ actuator 9 and possibly also the tip oscillator 8 to maintain stable interaction between the probe 17 and the sample 3.

The computer 12 also monitors the feedback signal generated by the displacement sensor 11 because the feedback signal is indicative of a characteristic of the sample 3. For example, in deflection mode, the feedback signal is used by the control computer 12 to control the XYZ actuator 9 so as to maintain a constant angle of deflection of the cantilever 1. To the extent that the topography of the sample surface varies, such variations will cause variations in the feedback signal that are indicative of the variations in the sample surface topography. Therefore, by measuring the feedback signal as the probe 17 scans the surface of the sample 3, a topographic map of the surface of the sample can be created and displayed on an image display 13. Of course, in addition to the feedback signal generated by the displacement sensor 11, other parameters could be measured that are indicative of a characteristic of the sample 3.

The AFM control computer 12 is connected to the sample heater 5a and controls the heating of the sample 3 via the sample heater 5a, either automatically or under user control. The system shown in FIG. 1 includes a potentiometer 14, a source of energy 15, and a thermocouple 16 which are used to control the probe heater 5b. The potentiometer 14 controls the amount of energy supplied to the probe heater 5b from the source of energy 15. The thermocouple 16 is used to provide temperature feedback in some modes of operation. Depending on the application, it may also be desirable to use a thermocouple 18 or other temperature feedback sensor in connection with the sample heater 5a to implement automatic feedback control of the sample heater 5a. The potentiometer 14, the source of energy 15 and the thermocouple 16 are discussed in greater detail below in connection with the discussion of FIGS. 4–6.

Figure 2:
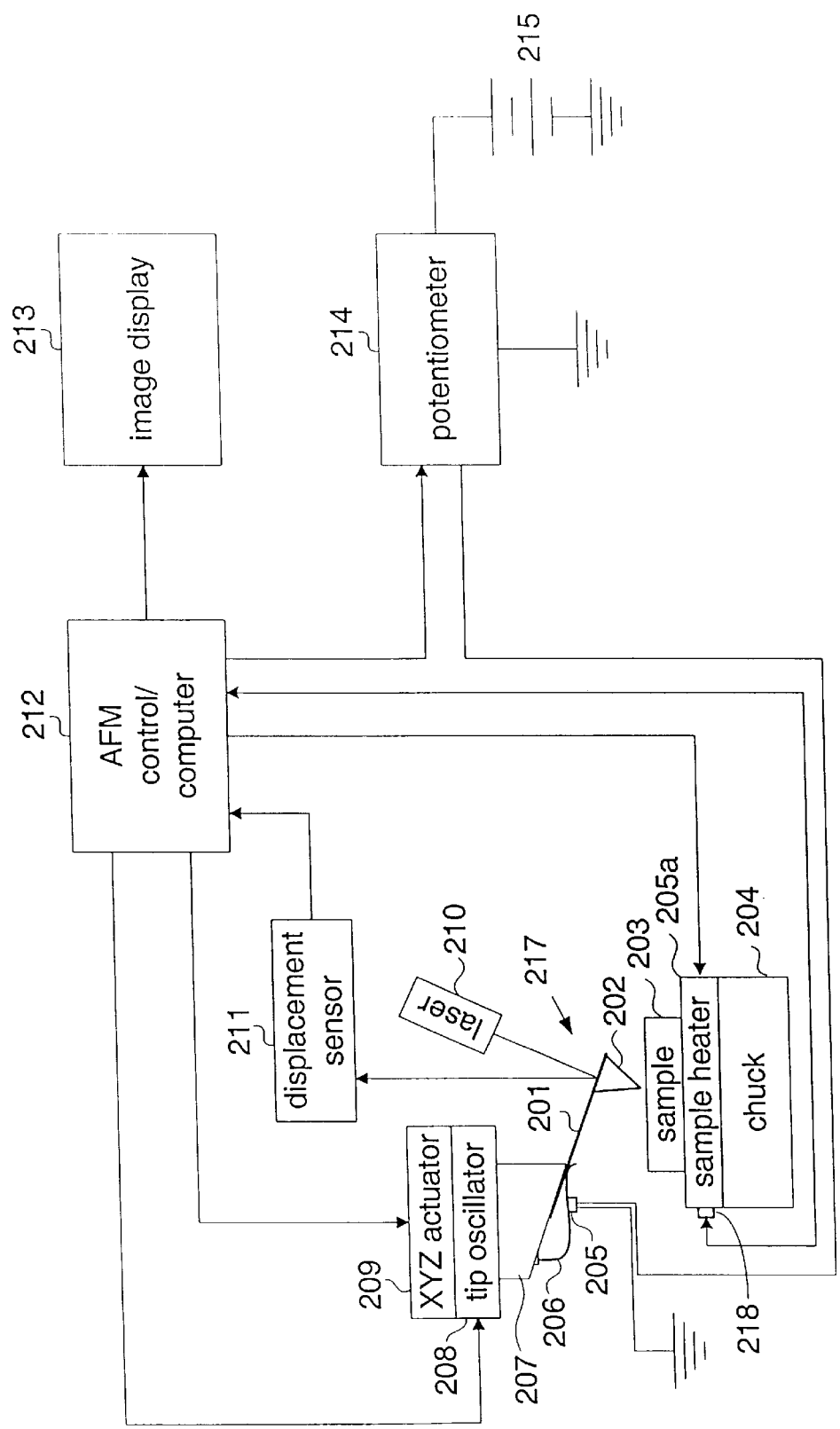
FIG. 2 is a schematic representation of a second embodiment of an AFM that is usable to take measurements of a heated sample.

Referring now to FIG. 2, a schematic representation of a second embodiment of an AFM that is usable to make measurements of a heated sample is illustrated. In FIG. 2, the reference numerals have been incremented by 200 to show correspondence between the elements of FIG. 1 and the elements of FIG. 2. The embodiment of FIG. 2 is similar to the embodiment in FIG. 1, except that there is no structure that corresponds to the thermocouple 16 in FIG. 1. Additional differences (not apparent from FIGS. 1 and 2) exist in the manner in which the computer 12 is programmed.

In FIG. 2, probe heating is achieved through automatic feedback control using a measured parameter of probe operation as a feedback parameter, at least during an initialization mode of the AFM. Instead of using feedback from a thermocouple, feedback from the displacement sensor 211 is used to control the heating of the cantilever 201 (although feedback from a different sensor could also be utilized). Additional details regarding this approach are given in connection with FIGS. 4A–4C and FIG. 5, discussed below.

Figure 3:
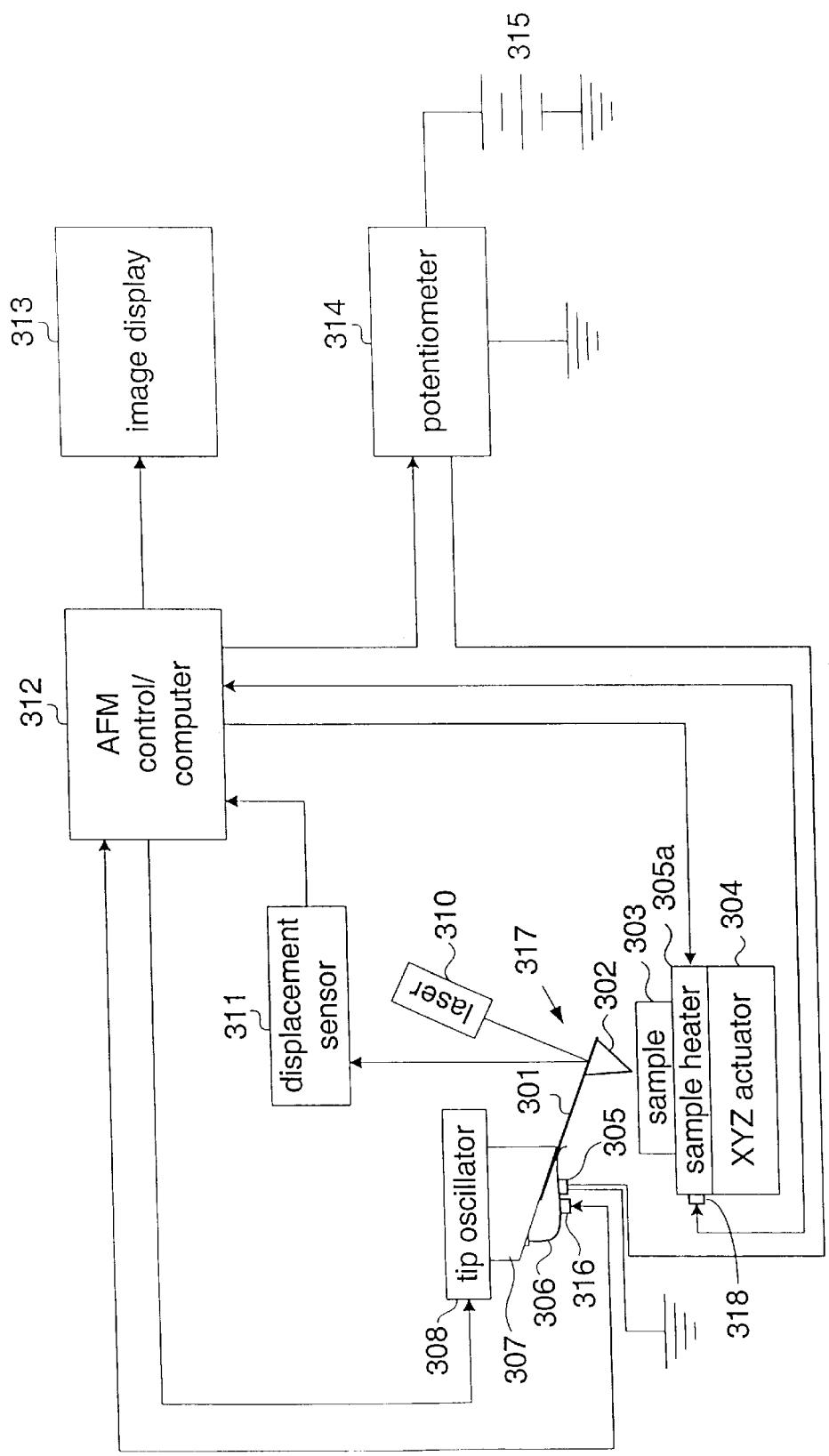
FIG. 3 is a schematic representation of a third embodiment of an AFM that is usable to take measurements of a heated sample.

Referring now to FIG. 3, a schematic representation of a third embodiment of an AFM that is usable to make measurements of a heated sample is illustrated. In FIG. 3, the reference numerals have been incremented by 300 to show correspondence between the elements of FIG. 1 and the elements of FIG. 3. The embodiment of FIG. 3 is similar to the embodiment of FIG. 1, except that the chuck 4 in FIG. 1 has been replaced with an XYZ actuator 304 which is associated with the sample 303 and, furthermore, there is no XYZ actuator associated with the probe 317. In the embodiment of FIG. 3, therefore, the sample is moved relative to the probe rather than vice versa as in FIG. 1. The actuator arrangement in FIG. 3 is therefore similar that found in the MultiMode™ AFM, whereas the actuator arrangement in FIG. 1 is similar that found in the Dimension™ AFM, both of which are commercially available from Veeco Instruments Inc. (MultiMode and Dimension are trademarks of Veeco Instruments Inc.).

2. Operation of Preferred Embodiments

Referring again to FIG. 1, the most preferred modes of operation of the invention, and especially the manner in which the probe heater 5b is controlled, will now be described in greater detail. For simplicity, the following discussion is presented with respect to the embodiment of FIG. 1. It should be understood, however, that the discussion is equally applicable to the embodiments of FIGS. 2 and 3.

In general, measurement stability is enhanced by heating the probe 17 to a temperature at which a measured parameter of probe operation is substantially free of influences caused by condensation on the probe. Ordinarily, at this temperature, the measured parameter of probe operation will be substantially stable. However, as will be appreciated, there are numerous sources of potential probe instability that are unrelated to condensation on the probe. Therefore, it is possible that, even though the probe is heated to a temperature at which a measured parameter of probe operation is substantially free of influences caused by condensation on the probe, the measured parameter will nevertheless be unstable. This of course is an indication that the AFM is not working properly for some other reason unrelated to condensation on the probe.

The temperature of the probe should preferably be high enough to prevent, remove, or at least substantially prevent condensation of water and volatile compounds on the probe. At normal atmospheric conditions, for example, water evaporates at 100° C. and most polymer additives evaporate around 80–120° C. Additionally, it normally will be desirable to heat the probe to a temperature that is not so high (e.g., 250° C. or more) as to cause melting or other breakdown in the structure of the sample, for example, when the tip 2 contacts the surface of the sample 3. Therefore, for a large range of applications, a probe temperature between 70–250° C. (or at least between 120–250° C.) will be acceptable and will provide stable operating conditions. In certain applications, significantly lower probe temperatures may also be utilized, as discussed below. Of course, for any given application, the acceptable range of probe temperatures will depend on the material tested, the test conditions, and so on.

Given that the acceptable range of probe temperatures will often be quite large, the temperature of the probe 17 need not be tightly controlled. Rather, the probe 17 can be heated to a temperature which is allowed to vary within a relatively large range of temperatures. It is therefore often acceptable to use a very simple control scheme to control the heater 5b, and two such control schemes will now be described. More sophisticated control schemes are discussed in connection with FIGS. 4A–4C and FIG. 5.

According to a first preferred approach for controlling the temperature of the probe 17, the temperature of the probe 17 is manually controlled. For example, if an oscillation mode of AFM operation is utilized, then, after the sample has been heated to an elevated temperature but before normal AFM operation (e.g., during an initialization procedure), the probe 17 is first oscillated at a distance sufficient from the sample to prevent direct probe-sample interaction, referred to as free oscillation. The user then monitors the probe oscillation frequency (or other parameter of probe operation), which is displayed on the display 13, to determine whether the oscillation frequency is substantially stable. During free oscillation, the oscillation frequency should be constant (i.e., non-time varying) because the probe 17 is not interacting with the sample. If the oscillation frequency is not stable, then the user gradually increases the setting of a potentiometer 14 until the oscillation frequency stabilizes.

Once the oscillation frequency (or other parameter of probe operation) stabilizes, the probe is then placed in an operative state in which the tip 2 interacts with the heated sample 3 and a parameter of probe operation indicative of a characteristic of the heated sample is measured, for example, to create a topographic map or image of the surface of the sample 3 or to create a compositional map of a distribution of polymer components in the sample 3. During this measuring, interaction is maintained between the probe and the heated sample that is substantially free of influences caused by condensation on the probe, i.e., because the probe is heated to a temperature at which the measured parameter of probe operation is substantially free of influences caused by condensation on the probe. Indeed, depending on when the probe is heated, the measured parameters may be substantially free of influences caused by condensation because condensation has not had an opportunity to form on the probe.

Another relatively simple approach for controlling the temperature of the probe 17 is to connect the input of the probe heater 5b to the input of the sample heater 5a. Thus, for example, if the sample heater 5a is driven with a voltage signal, the same voltage signal (or a predetermined derivative thereof) may also be used to drive the probe heater 5b. Assuming the heating of the sample heater 5a and the heating of the probe heater 5b are scaled the same way with respect to the input voltage signal (that is, both heaters achieve the same degree of heating per input volt), then the probe 17 will be maintained at approximately the same temperature as the sample 3. Therefore, if additives evaporate from the sample, they will also evaporate from the probe 17.

One advantage of the second approach is that it enables automatic control of the probe temperature without requiring any knowledge of the composition of the sample. However, a disadvantage of this approach is that it may result in unnecessary heating of the probe 17 to higher sample temperatures. For example, if the sample is heated to 250° C., this temperature is likely to be well above that required for stable AFM operation. Therefore, it would be desirable to provide an approach that enables automatic control of the probe temperature which does not require any knowledge of the composition of the sample and which does not result in unnecessary probe heating.

Figure 4A:
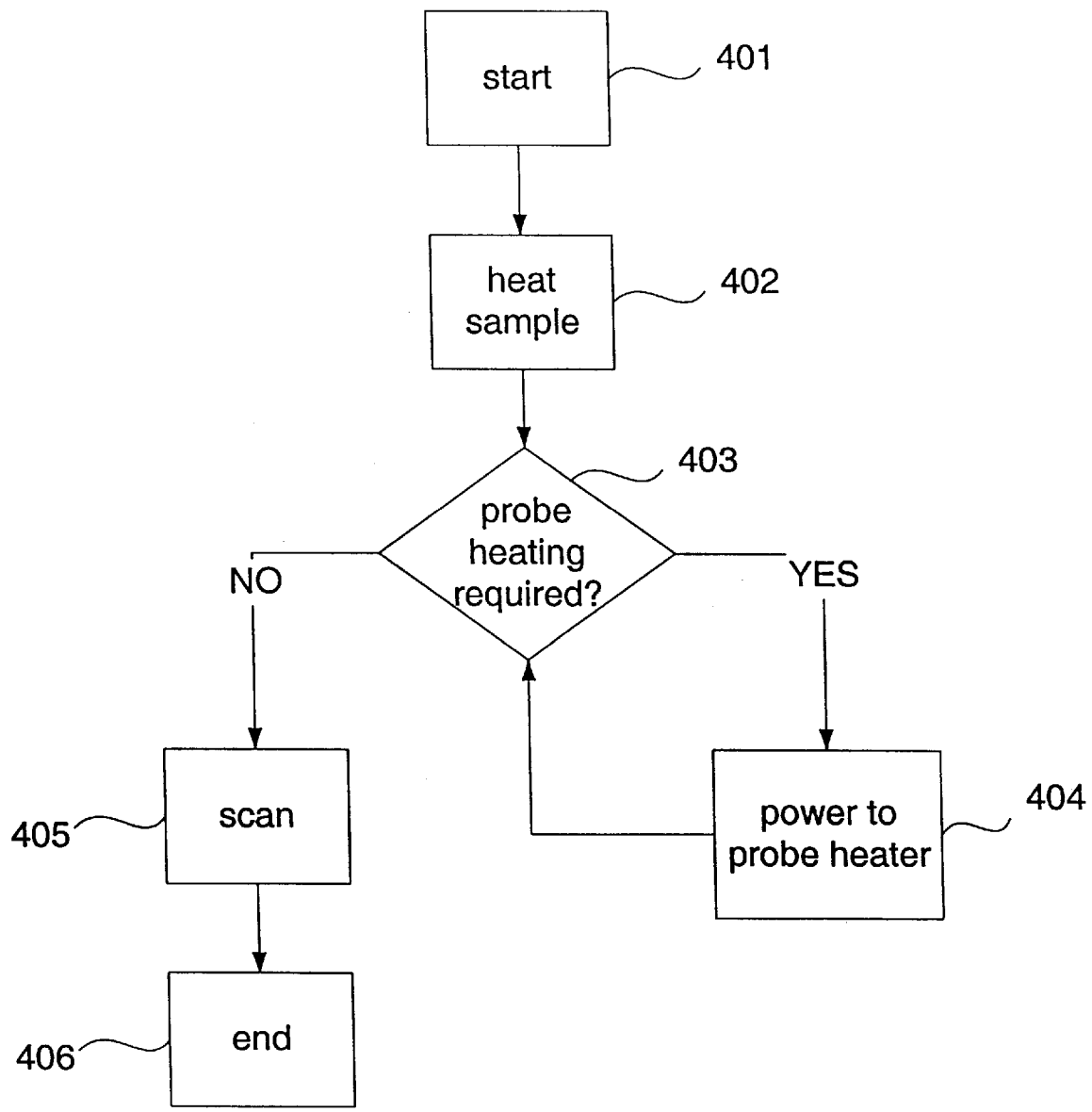
FIG. 4A is a flowchart representing a first embodiment of a process that is usable in conjunction with the AFMs of FIGS. 1 to 3.
Figure 4B:
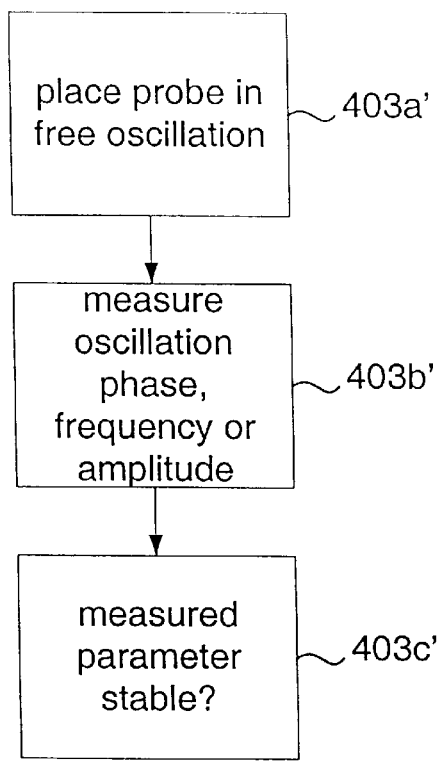
FIGS. 4B–4C are flowcharts describing in greater detail a process used to determine whether probe heating is required in connection with FIG. 4A.
Figure 4C:
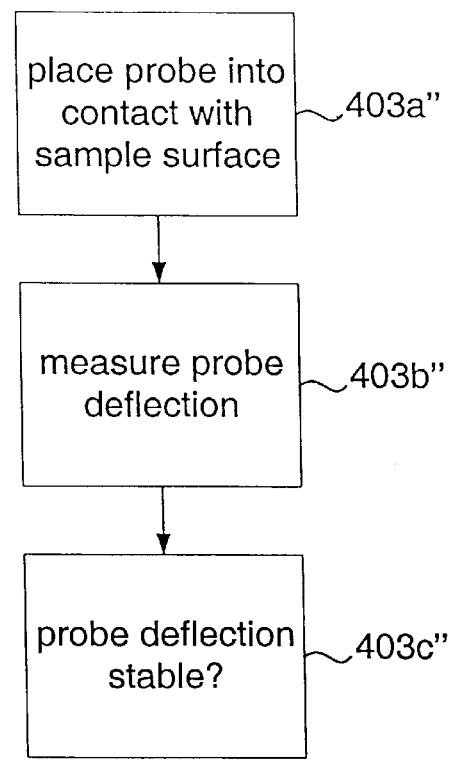

Referring now to FIGS. 4A–4C, a process that is usable to control probe heating and that enjoys these benefits is illustrated. Referring first to FIG. 4A, the process in FIG. 4A starts with an initialization of an initialization procedure for the AFM in step 401. The sample 3 is then heated to the temperature at which it is desired to make measurements at step 402. Once the sample is brought up to temperature, it is determined whether probe heating is required at step 403.

Step 403 can be implemented in a variety of ways depending on the feedback mechanism that is used to control the temperature to which the probe 17 is heated. Preferably, the feedback mechanism that is used to control heating of the probe 17 is the same mechanism that is used to make measurements of the sample 3. If the signal from this mechanism is stable for purposes of controlling heating of the probe 17, then it will also be stable for purposes of performing the measurement.

Assuming the same mechanism is utilized, then the manner in which step 403 is accomplished depends upon the mode of operation of the AFM. Referring now also to FIG. 4B, FIG. 4B illustrates a preferred implementation of step 403 when an oscillation mode is utilized. In step 403a', the probe 17 is put into free oscillation at a distance sufficient from the sample to prevent direct probe-sample interaction, but close enough to allow condensation to occur. A parameter of probe oscillation is then measured at step 403b'. Again, the parameter of probe oscillation that is measured depends on the operating mode of the AFM, but the parameter of probe oscillation may for example be oscillation frequency, amplitude or phase. In FIG. 1, the parameter of probe oscillation is measured using the laser 10 and the displacement sensor 11. The parameter of probe oscillation is then analyzed to determine whether it is substantially stable (e.g., non-time varying within acceptable limits for several seconds or minutes) at step 403c'. During free oscillation, the oscillation frequency should be constant because the probe 17 is not interacting with the sample. If the parameter of probe oscillation is not constant, then this indicates that additional probe heating is required.

Referring now to FIG. 4C, FIG. 4C illustrates a preferred implementation of step 403 when a contact mode is utilized. In step 403a'', the probe 17 is put into contact with a surface of the sample 3, but no XY scanning is performed. A parameter of probe deflection (e.g., deflection angle) is then measured at step 403b''. The parameter of probe deflection is then analyzed to determine whether it is substantially stable (e.g., non-time varying within acceptable limits for example for several minutes) at step 403c''. The parameter of probe deflection should be constant because no XY scanning is performed.

Referring to FIG. 1, the parameter of probe deflection is measured using the laser 10 and the displacement sensor 11. For example, assuming a four quadrant photodetector is used, as previously described, then deflection is measured by comparing the signal intensity for the top half of the photodetector with the bottom half of the photodetector. If the deflection is constant, then the difference between the signal intensity from the top half of the photodetector and the signal intensity from the bottom half of the photodetector should remain constant (indicating that the laser light spot reflected from the back surface of the cantilever 1 is not moving around on the four quadrant photodetector). Additionally, if the deflection is constant, then the sum of the signal intensity from the top half of the photodetector and the signal intensity from the bottom half of the photodetector should also remain constant (indicating that the intensity of the laser light spot reflected from the back surface of the cantilever 1 is not fluctuating). Presence of droplets on the back of the cantilever 1 can cause both movement of the laser light spot and fluctuations in the intensity of the laser light spot. If the parameter of probe deflection is not constant, then this indicates that additional probe heating is required.

Returning to FIG. 4A, if it is determined in step 403 that probe heating (or additional probe heating) is required, then power (or additional power) is supplied to the probe heater 5b at step 404, which raises the temperature of the probe 17. The process of steps 403 and 404 then continue until additional probe heating is not required at step 403. At this time, scanning is initiated at step 405. The probe is placed in an operative state in which the probe 17 interacts with the heated sample 3 and a parameter of probe operation indicative of a characteristic of the heated sample is measured. During this measuring, interaction is maintained between the probe and the heated sample that is substantially free of influences caused by condensation on the probe, i.e., the scanning continues until completed at step 406.

Figure 5:
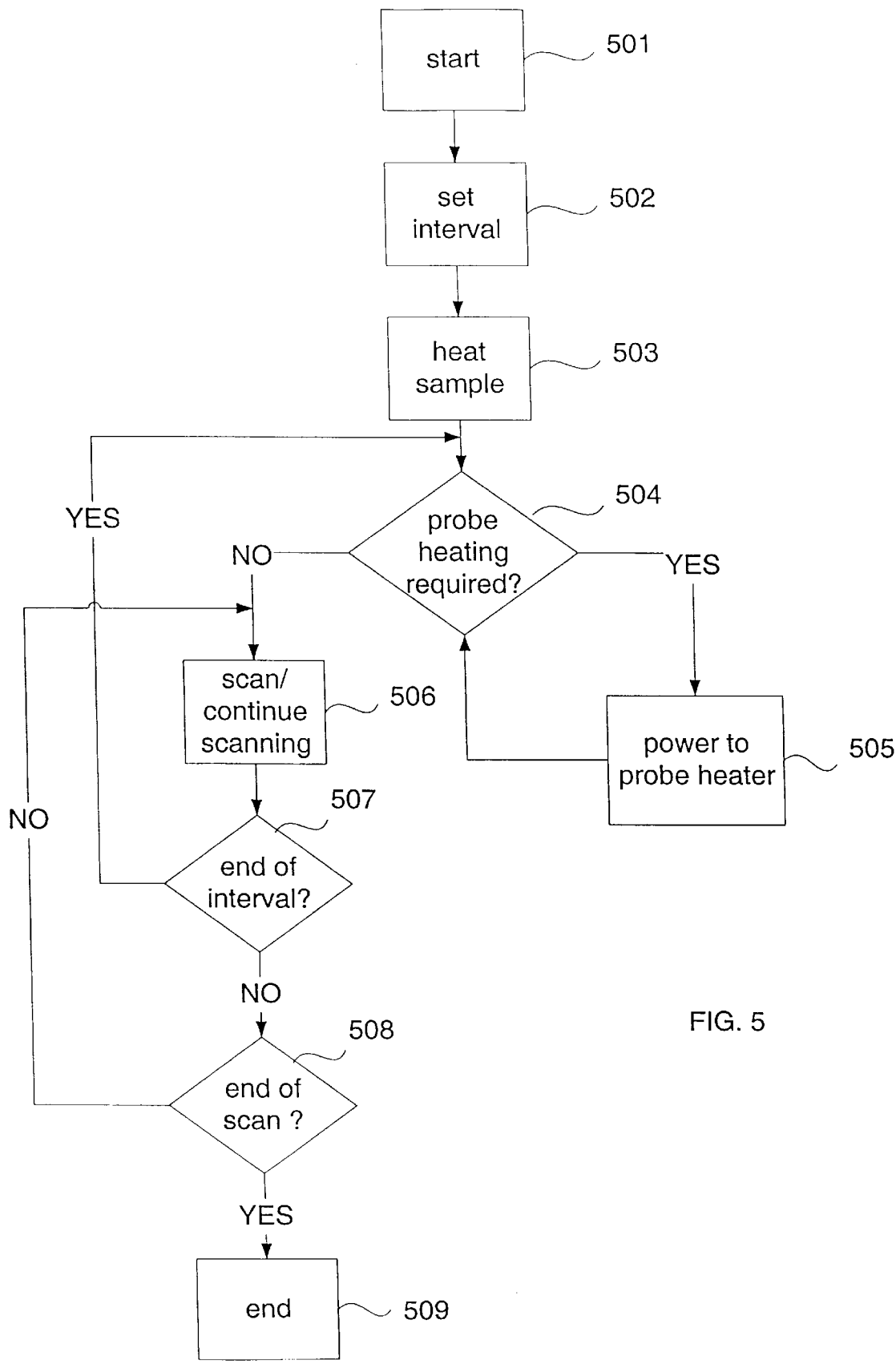
FIG. 5 is a flowchart representing a second embodiment of a process that is usable in conjunction with the AFMs of FIGS. 1–3.

Referring now to FIG. 5, a flowchart of another process that can be used to control probe heating is illustrated. Like the process in FIG. 4A, the process in FIG. 5 enables automatic control of the probe temperature without unnecessary overheating. The process illustrated in FIG. 5 is similar to the process illustrated in FIG. 4, except that provision is made to check the stability of the system at regular intervals.

Thus, the process in FIG. 5 starts with an initialization of an initialization procedure for the AFM in step 501. An interval is then set at step 502 that determines how often the AFM rechecks stability. Each interval may, for example, correspond to one scan line in a raster scan pattern if the probe 17 is scanned to create a topographic map of the surface of the sample. The sample 3 is then heated at step 503 to the temperature at which it is desired to make measurements. Once the sample is brought up to temperature, it is determined whether probe heating is required at step 504. Step 504 can, in practice, be implemented in the same way as step 403, as discussed above. Assuming that probe heating (or additional probe heating) is required, then power (or additional power) is supplied to the probe heater 5b at step 505, raising the temperature of the probe. The process of steps 503 and 504 continues until additional probe heating is not required at step 504. At this time, scanning is initiated at step 506, as discussed above in connection with step 405.

Scanning continues until the end of an interval (e.g., the end of a scan line or a predetermined period of time) is reached at step 507. If the end of an interval has been reached, then the process returns to step 504 and the stability of the measured parameter is reevaluated and, if necessary, the probe is heated. Otherwise, the process proceeds to step 508 in which it is determined if the scan is complete. If the scan is not complete, then the process returns to step 506 to continue scanning, otherwise the process ends at step 509.

Figure 6:
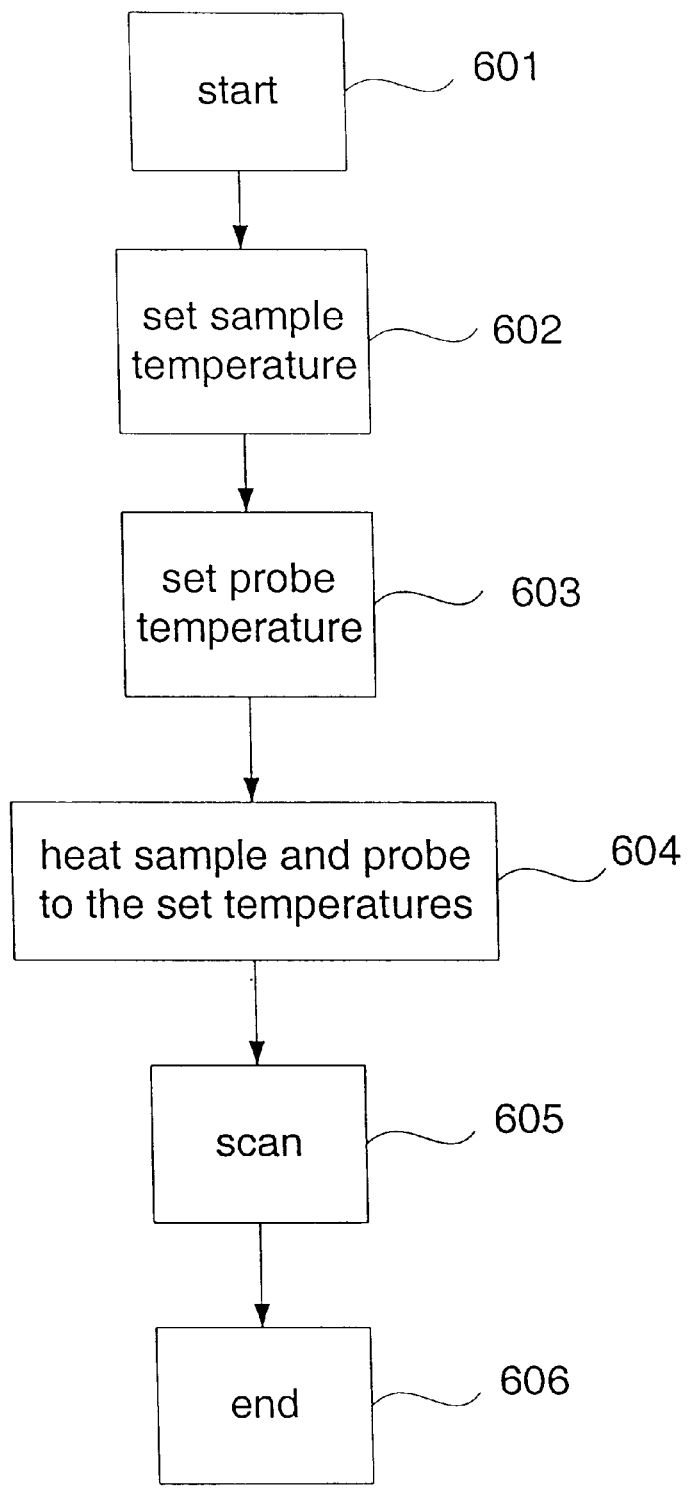
FIG. 6 is a flowchart representing a third embodiment of a process that is usable in conjunction with the AFMs of FIGS. 1–3.

Referring now to FIG. 6, a flowchart of another process that can be used to control probe heating is illustrated. In FIG. 6, the temperature of the probe 17 is set directly (either manually or by the computer 12). This approach may be used when the probe temperature required for stable operation is known, for example in a manufacturing situation in which the probe temperature required for stable operation can be determined in advance and thereafter used for day-in, day-out manufacturing operations.

The process starts at step 601, and the sample temperature is set to the temperature at which it is desired to make measurements at step 602. At step 603, the probe temperature is set to the temperature that is known to provide stable operating conditions for the known operating parameters (e.g., sample type, sample temperature, ambient humidity, etc.). If desired, the temperature of the probe 17 may be monitored using a thermocouple 16 mounted, for example on the spring clip 6. Alternatively, a probe that has an integrated thermocouple could be utilized. If the temperature is set manually, the output of the thermocouple 16 may displayed on the display 13 (as in FIG. 1) or more simply on a meter that is connected to the thermocouple 16. At step 604, the sample 3 and the probe 17 are heated to the set temperatures. At step 605, the scanning is performed as discussed above in connection with step 405 of FIG. 4A, and the process ends when scanning is complete at step 606.

Figure 7A:
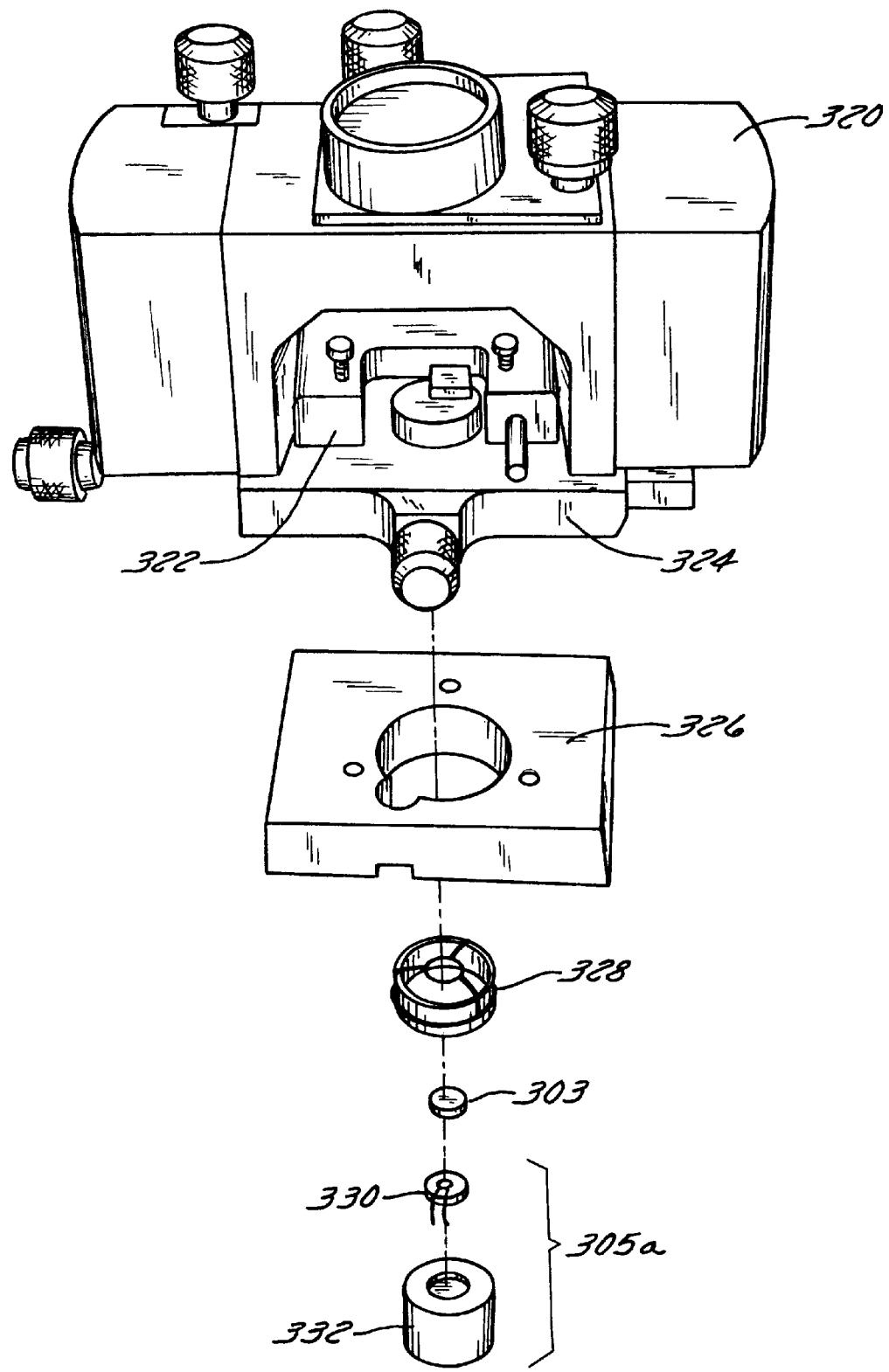
FIGS. 7A–7C are a first embodiment of a probe assembly with an associated probe heater.
Figure 7C:
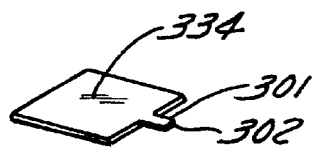
Figure 7B:
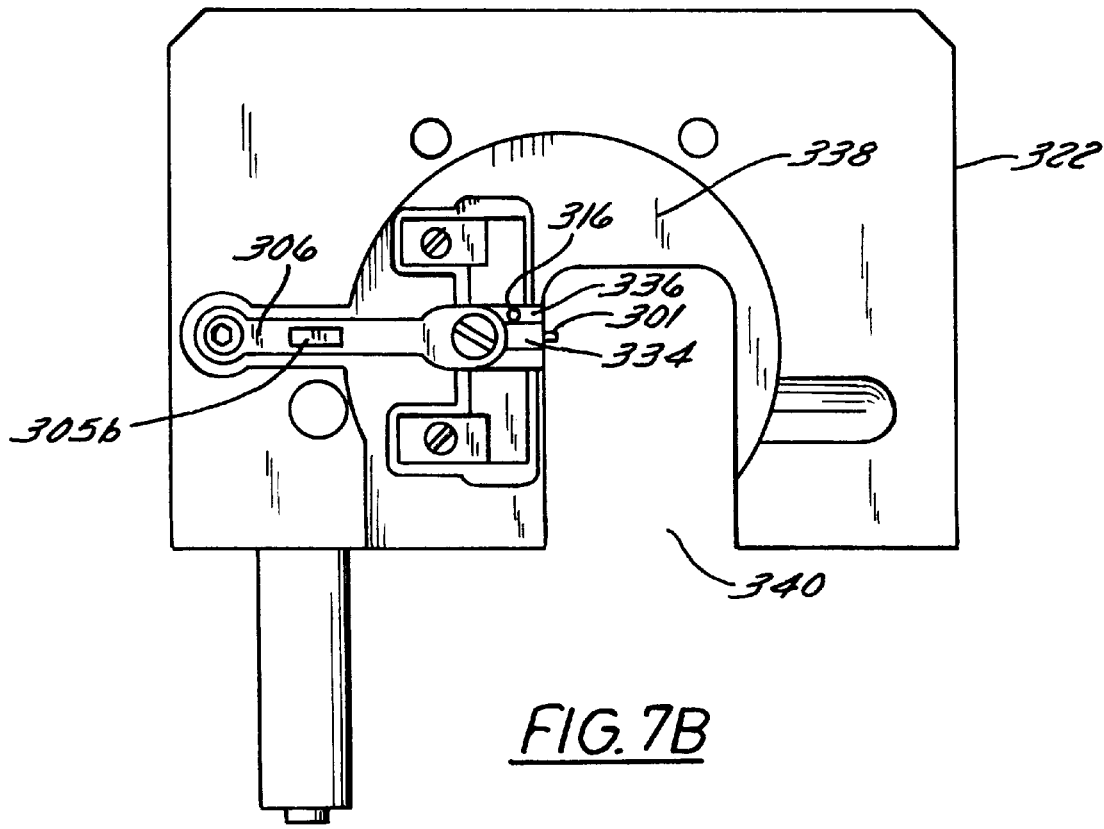

Referring now to FIGS. 7A–7C, a first embodiment of a head assembly having a probe with an associated probe heater is illustrated. FIGS. 7A–7C show a tip holder that is similar to the MultiMode™ force modulation tip holder commercially available from Digital Instruments, Santa Barbara, Calif. (MultiMode is a trademark of Veeco Instruments Inc.), except that it has been modified to include a probe heater and the thermal properties have been modified, as discussed below. The reference numerals used in FIGS. 7A–7C therefore correspond to those used in FIG. 3.

FIG. 7A is a perspective view of the entire head assembly. As shown therein, the head assembly includes a head 320 with a tip holder 322. The tip holder 322 includes a handle 324 for inserting and removing the tip holder 322 from the head 320. The head 320 fits over a spacer block 326. Within the spacer block 326 is a removable sample clamp 328 which is used to clamp the sample 303. The sample 303 is in thermal communication with the sample heater 305*a* which, in the embodiment of FIG. 7A, includes a microheater 330 and a ceramic block 332.

FIGS. 7B–7C show the tip holder 322 in greater detail. FIG. 7B is a bottom plan view of the tip holder 322. FIG. 7C shows the cantilever 301, and the probe up 302 in greater detail.

In FIG. 7B, the cantilever 301 is fabricated on a cantilever substrate 334 which is held in a socket 336 by the spring clip 306. A push rod (not illustrated) on the backside of the tip holder 322 allows the spring clip 306 to be pushed upwardly and allows the cantilever substrate 334 to be inserted. The heater 305*b* is mounted on the spring clip 306, which as previously mentioned is preferably made of copper to promote heat transfer from the heater 305*b* to the cantilever 301. In contrast, the remaining components of the tip holder 322 are preferably made of a thermally non-conductive material, to prevent conduction of heat away from the cantilever 301. Preferably, the cantilever substrate 334 is formed of a substantially homogenous material. If a non-homogenous material is utilized, then it is likely that the cantilever 301 will experience bending, like a bimetal strip. Finally, all of the components are preferably made of a material that is thermally stable, i.e., that do not expand or bend, or change shape in any other way when heated and cooled, or at least change in a predictable manner.

The heater 305*b* may be constructed in a variety of different ways. If a resistive heating element is utilized, a practical consideration is that the element should be small enough to be mounted near the probe yet rugged enough for industrial operation. The heater 305*b* may, for example, be a thermistor driven to generate heat instead of sensing heat. Currently, the preferred heater is a platinum resistive thermal device (RTD) sold by Heraeus Sensor of Philadelphia, Pa., part number 1PT100 FKG 222.4 RTD. Of course, numerous other arrangements are possible. For example, a radiant heating arrangement could be utilized to heat the probe 317 with radiant light energy, such as laser light.

Disposed on one side of the socket 336 is the thermocouple 316. The thermocouple 316 may, for example, be a K-type thermocouple from Omega of Stamford, Conn., part number 5TC-TT-K-36-36. The thermocouple could be in any of a number of positions sufficiently proximal to the substrate 334 to allow sensing of heating. Temperature may also be sensed remotely, as by infra-red imaging or in another manner.

The tip holder 322 includes a generally circular sample cavity 338 as well as an additional U-shaped cavity 340. In operation, the sample 303 fits within the sample cavity 338 and the sample 303 moves relative to the cavity 338. The light from the laser 310 is transmitted through the U-shaped cavity and is reflected from the back surface of the cantilever 301, and then returns back through the U-shaped cavity to the photodetector 311.

Figure 8C:
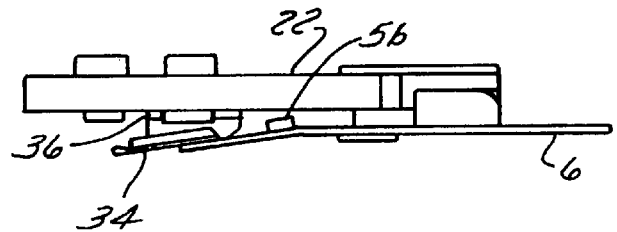
FIGS. 8A–8C are a second embodiment a probe assembly with an associated probe heater.
Figure 8A:
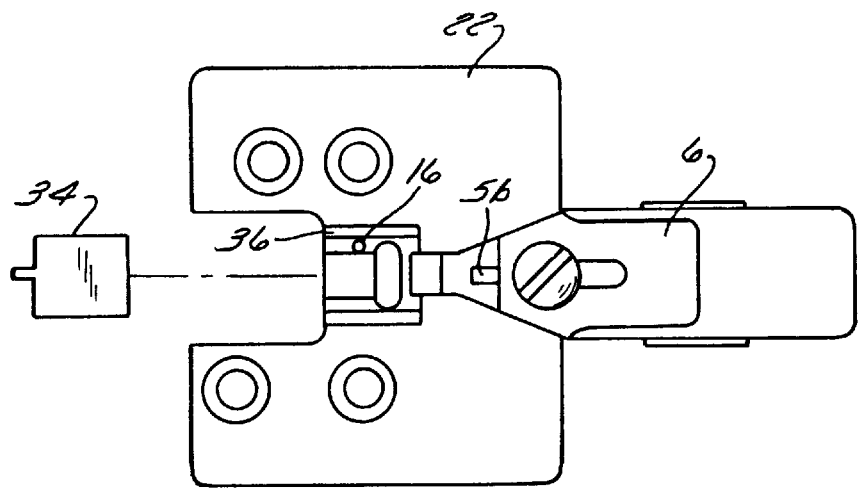
Figure 8B:
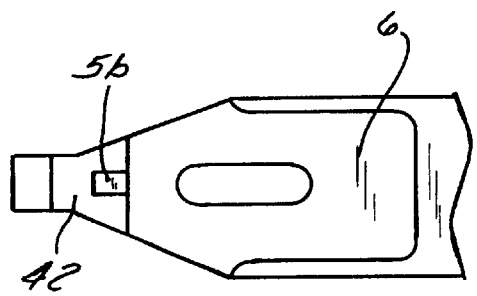

Referring now to FIGS. 8A–8C, a second embodiment of a tip holder with a probe heater mounted thereon is illustrated. The tip holder shown in FIGS. 8A–8C is similar to the Dimension™ tip holder commercially available from Digital Instruments ("Dimension" is a trademark of Veeco Instruments Inc.), except that it has been modified to include a probe heater and the thermal properties have been modified, as discussed below. Accordingly, the reference numerals used in FIGS. 8A–8C correspond to those used in FIG. 1.

The cantilever 1 is fabricated on a cantilever substrate 34 which is held in a socket 36 by the spring clip 6. The heater 5*b* is mounted on the spring clip 6. The spring clip 6 in this embodiment is made of fiberglass and preferably has a copper strip 42 mounted thereon to conduct the heat from the heater 5*b* to the cantilever 1. Disposed on one side of the socket 36 is the thermocouple 16. In operation, heat from the heater 5*b* is conducted through the copper strip 42 and heats the probe 17.

It has generally been assumed herein that AFM operation is conducted at or near room temperatures and that the probe and sample are heated above room temperature. However, it is often desirable to perform AFM measurements in conditions that are below room temperature. In this context, rather than using heaters to heat the sample and probe, heating the sample and/or the probe may actually comprise simply refrigerating the sample and probe less than the air or other material that surrounds the sample and probe.

Additionally, although the invention has been described in the context of atomic force microscopes, it should be understood that the invention applies equally to other probe-based instruments, such as other scanning probe microscopes and such as stylus profilometers, and any other method utilizing a probe-based measurement to study thermal expansion, the effects of infra-red heating, adhesion, stiffness, indentation, stretching of single molecules ("pulling"), etc.

Many changes and modifications may be made to the invention without departing from the spirit thereof. The scope of some of these changes has already been discussed. The scope of others will become apparent from the attached claims.

We claim:

1. A method of operating an atomic force microscope having a probe, said method comprising:
   (A) heating a sample;
   (B) measuring a parameter of probe operation and determining whether the measured parameter of probe operation is substantially stable;
   (C) raising a temperature of said probe if the measured parameter of probe operation is not substantially stable; and
   (D) repeating steps (B) and (C) until said probe reaches a temperature at which it is determined that the measured operating parameter of probe operation is substantially free of influences caused by condensation on said probe.

2. A method as defined in claim 1, wherein the measured parameter of probe operation is a probe oscillation frequency.

3. A method as defined in claim 1, wherein the measured parameter of probe operation is an oscillation phase of said probe relative to a phase of an oscillator which drives said probe to oscillate.

4. A method as defined in claim 1, wherein the measured parameter of probe operation is a probe oscillation amplitude.

5. A method as defined in claim 1, wherein the measured parameter of probe operation is deflection of said probe.

6. An atomic force microscope comprising:
   (A) a probe;
   (B) a probe heater that is thermally coupled to said probe and that heats said probe to a temperature above ambient temperature;
   (C) a sensor that measures a parameter of probe operation; and
   (D) a controller that is coupled to said probe heater, said controller controlling operation of said probe heater to heat said probe to a temperature at which the measured parameter of probe operation is substantially free of influences caused by condensation on said probe.

7. An atomic force microscope as defined in claim 6, wherein said probe is formed of a substantially homogeneous material.

8. An atomic force microscope as defined in claim 6, wherein said controller is also coupled to said sensor, and wherein said controller uses an output of said sensor as feedback indicative of the stability of the measured parameter of probe operation and, based on the feedback, to maintain said probe at a temperature at which the measured parameter of probe operation is substantially free of influences caused by condensation on said probe.

9. An atomic force microscope as defined in claim 6, wherein said heater comprises a resistive element that is mounted at least near a cantilever of said probe.

10. An atomic force microscope as defined in claim 6, further comprising a sample heater, said sample heater being capable of heating a sample inspected by said atomic force microscope.

11. A method of operating an atomic force microscope having a probe, said method comprising:
    (A) heating a sample;
    (B) measuring a parameter of probe operation, including generating feedback information pertaining to the stability of a measured parameter of probe operation; and
    (C) heating said probe, based on said feedback information, to a temperature that maintains the measured parameter of probe operation substantially free of influences caused by condensation on said probe.

12. A method of operating an atomic force microscope having a probe, said method comprising:
    (A) heating said sample;
    (B) measuring a parameter of probe operation, including generating feedback information pertaining to the stability of the measured parameter of probe operation; and
    (C) heating said probe, based on said feedback information, to a temperature that maintains the measured parameter of probe operation substantially free of influences caused by condensation on said probe, wherein the measured parameter of probe operation is a probe oscillation parameter.

13. A method of operating an atomic force microscope having a probe, said method comprising:
    (A) heating said sample;
    (B) measuring a parameter of probe operation, including generating feedback information pertaining to the stability of the measured parameter of probe operation; and
    (C) heating said probe, based on said feedback information, to a temperature that maintains the measured parameter of probe operation substantially free of influences caused by condensation on said probe, wherein the measured parameter of probe operation is deflection of said probe.

* * * * *